United States Patent [19]

Benz et al.

[11] 3,872,440

[45] Mar. 18, 1975

[54] HOSPITAL COMMUNICATION SYSTEM

[75] Inventors: Leo Benz; Dieter Klein, both of Munich; Manfred Bauer, Neubiberg; Albert Figel; Rolf Treutlin, both of Munich, all of Germany

[73] Assignee: Alois Zettler Elektrotechnische Fabrik GmbH, Munich, Germany

[22] Filed: July 10, 1974

[21] Appl. No.: 487,171

Related U.S. Application Data

[63] Continuation of Ser. No. 376,561, July 5, 1973, abandoned.

[30] Foreign Application Priority Data

July 10, 1972 Germany .......................... 2223797

[52] U.S. Cl. ............................ 340/171 R, 340/286

[51] Int. Cl. ............................................ H04q 5/00

[58] Field of Search ........ 340/171 R, 171 A, 286 R; 178/5.6

[56] References Cited

UNITED STATES PATENTS 3,534,161 10/1970 Friesen .............................. 178/5.6

*Primary Examiner*—Harold I. Pitts
*Attorney, Agent, or Firm*—Hans Berman

[57] ABSTRACT

Signals are transmitted in a hospital communication system between sub-units of room units and a central nurses station over a common high frequency line, each room unit having an identifying high frequency assigned thereto which simultaneously comprises the address signal of the room unit and the carrier for address signals of sub-units.

26 Claims, 13 Drawing Figures

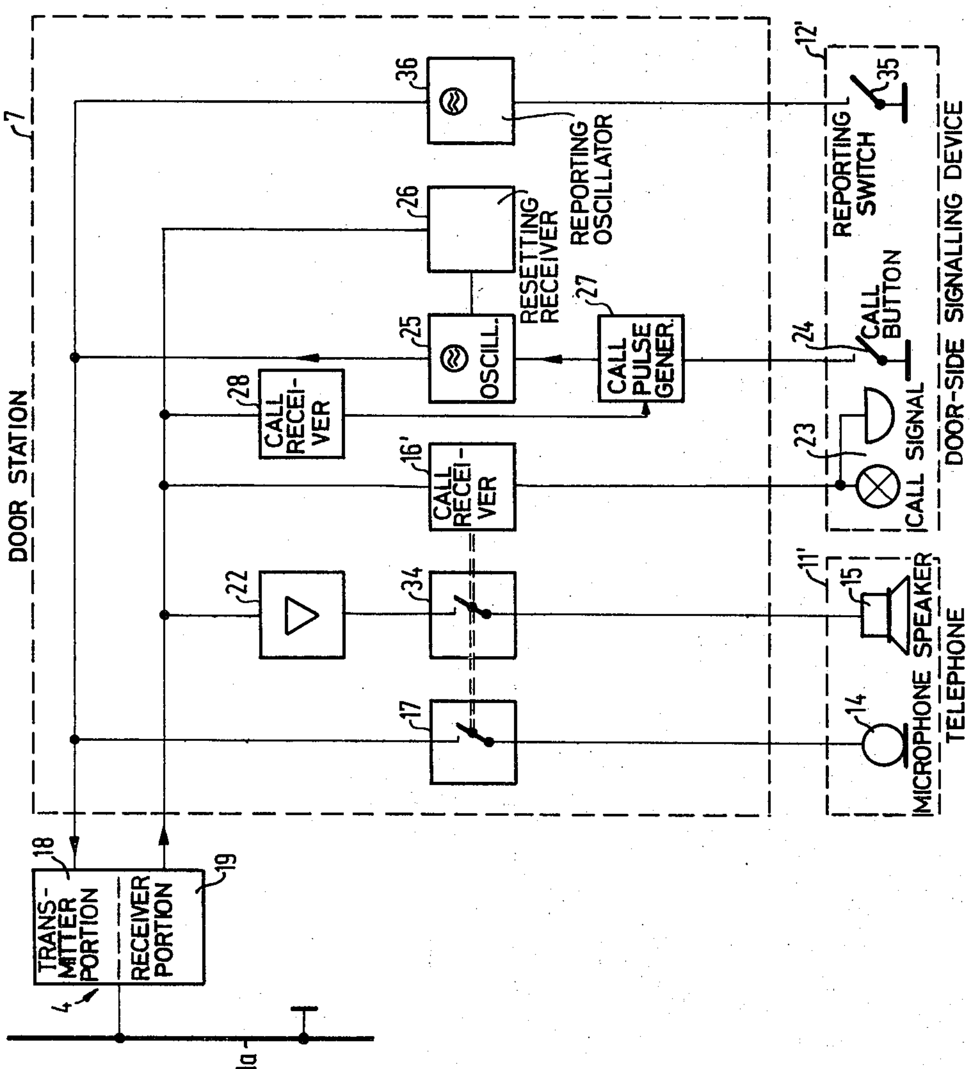
Fig.5
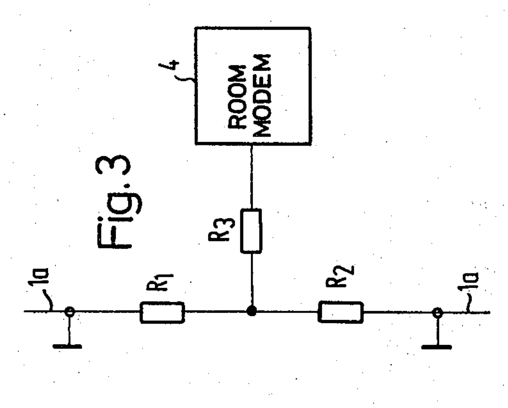

HOSPITAL COMMUNICATION SYSTEM

CROSS REFERENCE TO RELATED APPLICATION

This application is a continuation of Ser. No. 376,561 Filed On July 5, 1973, now abandoned.

This invention relates to a communication system for a hospital. More particularly, this invention relates to a communication system for transmitting signals between sub-units of room units and a central nurses station.

BACKGROUND OF THE INVENTION

As is well known, in a hospital patients call nurses over a communication system, which, in its simplest form, comprises a signal light mounted above the door of the patient's room. Costlier communication systems indicate the call of a patient at a central nurses station and permit oral communication between the patient and the nurse at the station.

Known communication systems connect the hospital beds to the central station in a star-shaped circuit using d.c. lines. The d.c. lines transmit control signals by means of which patients may call the central station and vice versa. It is very expensive to install d.c. lines which are connected with the central station in a star circuit and many lines converge on the central station. The great number of individual lines makes such a communication system prone to malfunctioning, particularly when telephone lines for oral communication are also arranged in a star-shaped circuit.

Other known communication systems arrange the oral communication lines, together with lines for radio reception and some of the control lines, in a round-robin circuit extending from room to room. Oral communication with specific beds is controlled by means of relays.

Other known communication systems feed a pulse signal to each room or bed by way of a round-robin circuit. Each room or bed is identified by a specific coded sequence of pulses which are generated at the central nurses station by a time-multiplex technique. Each bed calls with its associated code pulse sequence and, in turn, is called by its specific sequence. Such a communication system is costly and also requires a substantial number of round-robin circuits.

It is also possible to use carrier frequency systems in hospital communication systems. Carrier frequency systems reduce the number of lines which are necessary, however, these systems are costly because of the need to use accurate filtering systems to separate out the large number of communication channels. Such a carrier frequency system is disclosed, for example, in the published German Pat. application No. 1,487,386 where it is used as an electronic telephone distribution system. The central station is equipped with a multiplicity of transceivers respectively tuned to different frequencies and cooperating with a corresponding multiplicity of transceivers at the outlying stations. The individual outlying stations are connected with the central station by a common line. This known telephone distribution system, however, would have the disadvantage, when used in a hospital, of requiring a very extensive transceiver installation at the central station because of the large number of channels which would be required in a hospital.

It is an object of this invention to reduce the bulk and cost of the central installation that is required for specifically addressed transmission of communication signals by means of a common conductive line.

SUMMARY OF THE INVENTION

The communication system according to this invention solves the above problem by the provision of a receiving apparatus coupled to the high frequency line for receiving communication signals from the room unit, which receiving apparatus in one embodiment is tuned sequentially to the characteristic high frequencies of the room units.

The term "room unit" as employed herein is intended to designate not only a single room but a functional grouping of several sub-units which, for example, in the case of single-bed rooms may include several rooms. The term "sub-unit" will be used herebelow to refer to the devices associated with a single bed or those devices which are associated with one room or jointly with a room unit. Communication signals may include sub-unit address signals, control signals, and information signals, such as oral communications or telemetery signals. The receiving device transmits communication signals received from the high frequency line, which signals are sequentially modulated upon characteristic high frequency oscillations, for example, to indicating devices which are designated by the room unit address signal or the sub-unit address signal.

The communication system according to this invention, thus, largely reduces the requirements for the central installation while keeping the connecting lines between the central station and the room units at a minimum. Because a high frequency line is employed, radio and television signals may also be transmitted over the system. Advantageously, the high-frequency line is led between the rooms following the shortest possible path. The communication system according to this invention reduces the number of frequency channels necessary because it assigns to each room, and not to each bed, a separate frequency channel. This substantially reduces the cost because it is possible to separate the individual frequency channels by relatively inexpensive, broad-band filters. Each room unit transmits and receives signals by way of the high frequency line and permits oral communication and the transmission of information in both directions. Sub-units connected to the room units are identifiable in a simple manner by different sub-unit address signals. The communication system makes use of the organization of the hospital into nursing groups, rooms and beds and combines economical operation with low tendency to malfunctioning.

Low audio frequencies, for example for oral communication, may be transmitted directly by way of the high frequency line. In this case, however, only a single conversation at a time can be transmitted over the high frequency line. This number can be increased to one conversation per room unit if the characteristic high frequency signals are also carriers for audio signals. The communication system according to this invention, however, does not exclude the possibility of transmitting audio frequencies as well as control signals which are to be broadcast simultaneously to all room units by way of the high frequency line. The control signals of the sub-unit can be evaluated in a particularly simple manner if a synchronizing signal, fed by way of the high frequency line, synchronizes sub-unit address signals and/or the control signals of the sub-units in each group.

A particularly economical communication system combines room units and nursing units in a manner which corresponds to specific requirements of the hospital. In such a case, each room unit of a group is assigned a different characteristic frequency in a sequence of characteristic frequencies repeated for each group.

If a transmitter frequency is assigned to each room unit and a different receiver frequency is assigned to the same room, it is possible to simultaneously transmit control signals while maintaining two-way oral communication between the patient and the nurses in the central station. It is particularly advantageous from the point of view of economy to maintain equal frequency spacing of the transmitting and receiving frequencies for all room units. Moreover, the transmitting frequency may be readily derived from the superimposed receiving frequency, particularly if the frequency spacing corresponds to the intermediate frequency.

Because each room may be identified by the frequency as assigned to its room unit, the sub-units of each room unit may be arranged in a particularly simple manner if they are assigned different sub-unit address signals from a sequence of sub-unit address signals which repeats in each room unit.

The selection and indication of a sub-unit address signal and/or a control signal is particularly simplified by this arrangement. The sub-unit address signal and/or the control signal is preferably a low-frequency signal having a sub-unit address frequency or a control frequency or a sequence of code-pulses. Additional control functions may be initiated by modulating the low frequency signal with a sequence of code pulses. The low frequency signals are readily separated from each other by means of a filter.

It is important that emergency calls be preferentially answered in a hospital. This is achieved in a simple manner by assigning to each address signal a rank characterizing signal which identifies the rank of the control function to be initiated. The rank characterizing signal may be, in one embodiment of the invention, a modulation superimposed on the sub-unit address frequency and/or the control frequency, which may be evaluated in a particularly simple manner if the rank characterizing signal is a sequence of code pulses capable of being synchronized by synchronizing signals. If the synchronizing signal synchronizes the code pulse sequence, the evaluation is particularly simplified so that the pulses from different room units may occur simultaneously.

In an illustrative embodiment, the sub-unit address signal and/or the control signal are superimposed on a low frequency carrier which is common to a multiplicity of sub-units. Such an arrangement is advantageous if storage devices are intended to store the transmission of the sub-unit address signal and/or the control signal. In such a case, the common low frequency may be employed for preparing the storage device for recording.

An identical additional control signal may be assigned to identical accessory devices connected to respective sub-units. This is sufficient because in the communication system of the invention each sub-unit is specifically identifiable.

In an embodiment of the communication system, the receiving apparatus at the central station has an individual high frequency receiver coupled to the high frequency line for each room unit, the receiving frequency being tuned to the characteristic frequency of the associated room unit. A preferably electronically operated selector switch selects individual high frequency receivers in timed sequence and thereby tunes the receiving apparatus. Individual high frequency receivers may consist of simple filters because the modulation of the communication signals which are modulated on the high frequency carrier may occur also after the selector switch has been operated.

An additional embodiment of the invention is arranged in such a manner that the receiving apparatus at the central station includes at least one tunable high frequency receiver coupled to the high frequency line, the receiving frequency being tuned in timed sequence to the characteristic frequencies of the individual room units.

This arrangement substantially reduces the cost of a communication system according to the invention because the number of individual high frequency receivers necessary is greatly reduced. This advantage is of particular importance if several nursing groups each having the same sequence of characteristic frequencies are combined at the central station, that is, if the characteristic high frequencies for each group appear several times.

Received address signals can be represented in a particularly simple manner if the central station has a signalling device for each room unit or for each sub-unit of a room unit, the signalling device indicating a transmission of the room unit address signal and/or the sub-unit address signal and/or the control signal over the characteristic frequency of the respective room units. In such an arrangement, the nursing personnel can immediately establish the number of calls received.

If many signalling devices must be provided in a call board, a common indicating device reproducing digital numbers may substantially reduce the required space. Such an advantageous arrangement is characterized in that the transmitted room unit address signals and/or sub-unit address signals and/or control signals on the characteristic frequencies of the room units are stored by a decoding device at the central station and that a common indicating device reads and indicates the room unit address signals and/or sub-unit address signals and/or control signals present in the decoding device in timed sequence. Work of the nurses in the central station is substantially simplified if the decoding device includes a counter which converts a room unit counting system such as a counting system based on counting the room units in the sequence of their characterizing frequencies into another counting system based, for example, on consecutive counting of the room units or nursing groups in the building, the room unit address signals being indicative of the room numbers according to the latter counting system. Thus, the actual room number of the room in the building may be indicated.

As previously discussed, it is necessary that emergency calls be answered preferentially. A further embodiment of the invention thus provides a rank testing device which separates the rank characterizing signal from the address signal, determines the address signal having highest rank, and thereafter determines the time sequence in which the address signals are indicated. In an embodiment in which each room unit is assigned to a signal indicating device, this is advantageously achieved by emphasizing the address signal highest in rank, for example, by flickering of an indicating device associated with the room unit. If only one common indicating device is present, the rank testing device determines the time sequence in which the address signals are to be indicated.

According to a further feature of the invention, the central station can be arranged in such a manner that, for each room unit, it is equipped with an individual high frequency transmitter coupled to the high frequency line for transmitting audio signals and/or sub-unit address signals and/or control signals, the transmitting frequency being tuned to the characteristic frequency of the associated room unit. The nursing personnel in the central station can call each sub-unit by means of this individual high frequency transmitter, converse with the patient, and collect information such as measuring data. The number of individual high frequency transmitters necessary can be reduced by providing the central station with at least one tunable high frequency transmitter coupled to the high frequency line for transmitting audio signals and/or sub-unit address signals and/or control signals, the transmitting frequency being selected according to the characteristic frequency of the room units. The nursing personnel selects the transmitter frequency according to a call indicated on the indicating device.

If the central station is equipped with a tunable high frequency receiver switching from one frequency to the next according to a predetermined program, the central station is equipped with at least one tunable high frequency receiver for receiving control signals and/or audio signals, the tunable high frequency receiver and the tunable high frequency transmitter being turned to the characteristic frequency of the same room unit. This arrangement permits the transmission of audio signals or data information if the consecutively switched tunable high frequency receiver essentially only establishes that a call has come from the patient to the central station.

In an advantageous modification of the communication system, it becomes possible to transfer calls between one or several nursing groups. If the central station, for example, is not manned during the night, the patient may then call a nurse or other attendant from one of the rooms of his own or of an adjacent nursing group. An advantageous apparatus for this purpose is arranged in such a manner that a first and a second scanning transceiver are coupled to the high frequency line, that the transmitter of the first scanning transceiver is connected with the receiver of the second scanning transceiver, and the receiver of the first scanning transceiver is connected with the transmitter of the second scanning transceiver on the low frequency side by respective low frequency lines, during a scanning call from one room unit into another, the transmitting and receiving frequency of the first and second scanning transceivers being tuned to the characteristic receiver frequency and the characteristic transmitting frequency of one, as well as of the other, room unit.

If, for example, continuous supervision of a patient in an intensive care station is needed, measuring devices may be connected as accessory apparatus to a sub-unit. The data generated by these devices may be interrogated automatically and recorded, or fed to a data processing unit, when a central accessory device station responds selectively to the additional control signal transmitted on the room unit address signal and switches on the accessory devices by means of sub-unit address signals and/or accessory device control signals transmitted to the sub-unit and calls for the information.

Because in a system of this type installation of a high frequency line is unavoidable, it is advantageous that an antenna be coupled to the high frequency line and that the inputs of conventional radio and/or television receivers be connected to the high frequency line through conventional coupling devices. The television receivers, which normally serve for entertainment, may then automatically transmit a picture from the central nurses station when an oral communication is established. In this manner, the personal contact between the patients and the nursing personnel can be enhanced.

All necessary data communications within the hospital may be transmitted by way of the high frequency line. Aside from signals for processing of data, initiating signals for a fire alarm system or timed pulses for synchronizing clocks may be transmitted. In order not to unnecessarily tie-up the high frequency transmitters provided for the calls of the patients and their oral communications, it is contemplated that a supplemental high frequency transmitter and/or a supplemental high frequency receiver be arranged for coupling to the high frequency line at predetermined locations which permit the transmission of the other signals and/or control signals and/or oral communications by means of a supplemental characteristic frequency as an address signal. The supplemental high frequency transmitter and the supplemental high frequency receiver are preferably portable and are thus capable of being installed where needed. If at least one supplemental high frequency receiver in the central station is connected with a recording device, for example for voice or data, a portable supplemental high frequency transmitter serves as a "note book" on which, for example, the patients's diagnosis may be written during a physician's visit.

If the central station is equipped with a switching arrangement which permits telephone calls to be transmitted by way of an oral communication system existing between the central station and the room units or sub-units, the communication system according to the invention makes it unnecessary to provide a separate telephone station for transmitting telephone calls.

Each room unit has an individual high frequency transmitter and a high frequency receiver whose characteristic transmitting and receiving frequency are determined by the superimposed frequency of a free running oscillator. These oscillators may be avoided if the superimposed frequency which determines the characteristic transmitting and receiving frequencies is determined by a frequency synthesizer from a reference frequency transmitted over the high frequency lines.

BREIF DESCRIPTION OF THE DRAWINGS

The invention will be explained in more detail with reference to the following drawing in which:

FIG. 3 shows a device for coupling to a high frequency line;

FIG. 5 is a block circuit diagram of a door station;

DESCRIPTION OF THE PREFERRED EMBODIMENT

Figure 1:
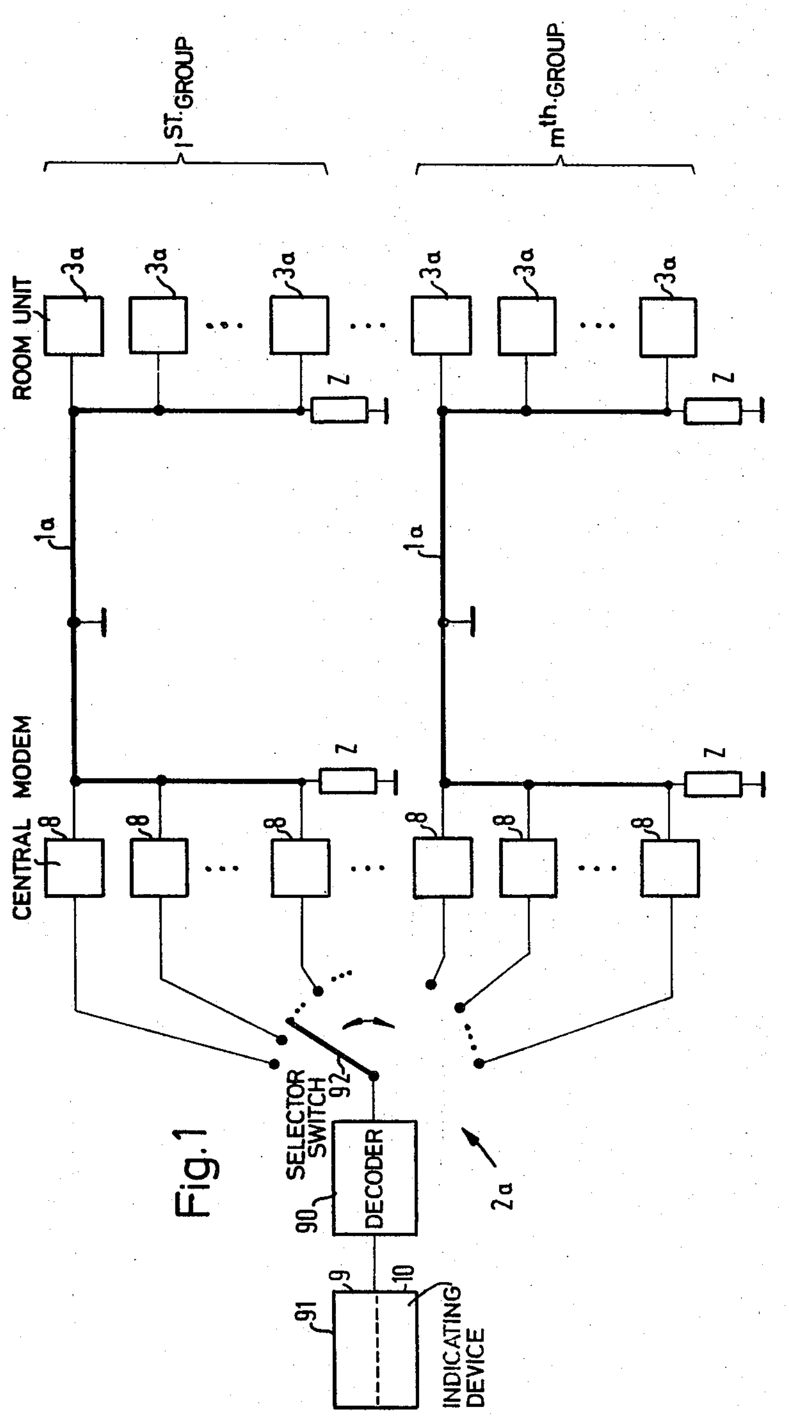
FIG. 1 is a schematic block circuit diagram of a communication system according to the invention.
Figure 2:
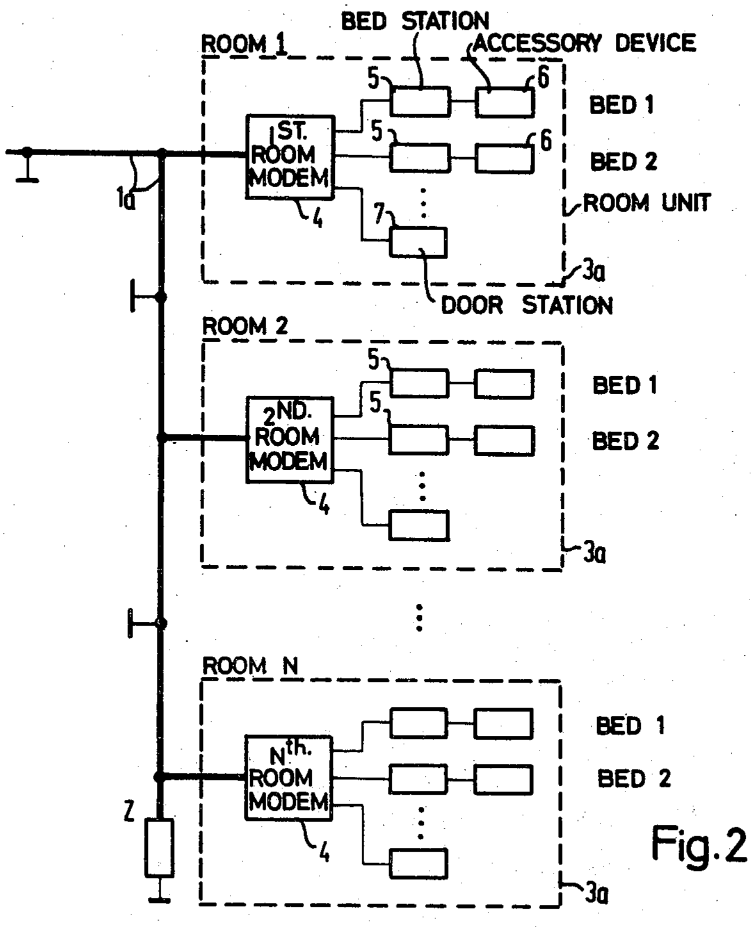
FIG. 2 is a block circuit diagram of the room units of the communication system according to FIG. 1.

FIG. 1 shows the basic block diagram of a communication system according to the invention. A high frequency line 1*a* connects a central section 2*a* with a plurality of room units 3*a*. The high frequency line 1*a* is a coaxial cable which is arranged in the shortest possible path between the central station 2*a* and room units 3*a* and whose free end terminates in its characteristic impedance Z. Each room unit 3*a*, as is shown in FIG. 2, has a room modem 4. The room modem 4 is a transceiver selectively associated with the transmitting and receiving frequency assigned to one of the room units 3*a*. The room modem 4, as well as a central modem 8 described hereinbelow, are connected to the high frequency line 1*a* in such a manner that there is no impedance mismatch. The same holds for all devices described herebelow which are directly connected to the high frequency line 1*a*, although this will not be specifically mentioned in each instance.

A simple connection providing a correct impedance match is shown in the circuit diagram of FIG. 3. The room modem 4 is connected by a resistor $R_3$ to the center-tap of a series connection of two resistors $R_1$ and $R_2$ inserted in the high frequency line 1*a*. The resistors $R_1$, $R_2$, and $R_3$ are selected in such a manner that the input resistance of the room modem 4 on the high frequency side does not change the characteristic impedance of the high frequency line 1*a*.

A bed intercom station 5 having one or more accessory devices 6 is provided for each bed of the room and is connected to the modem 4. Moreover, a door station 7 is also connected with the room modem 4 in each room. The connection of the door station 7 and of the bed station 5 with the room modem 4 is effected by two lines which are also coaxial cables.

A central modem 8 in the central station 2*a* corresponds to each room modem 4 of the room units 3*a*. The central modems 8 are connected to a selector switch 92 which connects them in timed sequence with a decoder 90 and thence to an indicating device 91 associated with each decoder 90. The decoder 90 checks whether a call is being transmitted over this central modem 8. Room units 3*a* in FIG. 1 are arranged in groups 1 to *m* which are each connected with the central station 2*a* by their own high frequency lines 1*a*.

The indicating device 91 comprises a call indicating device 9 which indicates signals from the bed stations 5 of each room unit 3*a*, as well as a paging signal device 10 by means of which nursing personnel can indicate their presence in any specific room associated with the central station by actuating the door station 7. However, the output signal of an automatic paging control may be fed to the door station 7.

Each room modem 4 and each central modem 8 has a transmitter section and a receiver section, as will be described in more detail herebelow. The transmitter section transmits a high frequency carrier signal associated with the room modem 4, or the central modem 8, to the high frequency line 1*a*. Each room unit 3*a* is thus assigned a characteristic modem frequency. The characteristic modem frequencies of each room unit 3*a* are spaced apart by the same frequency. Control signals generated in the bed station 5, the accessory device 6, the door station 7, or a calling device in the central nurses station 2*a* are modulated by the transmitter section onto the high frequency carrier signal. The control signals are modulated or unmodulated low frequency signals of different frequencies which are associated with the various functions of the communication system. The receiver section of the room modem 4 is tuned to the characteristic modem frequency of the transmitter section in the associated central modem 8. Correspondingly, the receiver section of the central modem 8 and the transmitter section of the associated room modem 4 have the same characteristic modem frequency.

Up to 40 room units 3*a* may be connected to the central station 2*a*. The characteristic modem frequencies of the room units 3*a* are spaced apart by 250 KHz in the frequency band of 20 – 30 MHz for transmitting and 30.7 – 40.7 MHz for receiving. The two characteristic modem frequencies of a given room unit 3*a* are spaced apart by a constant 10.7 MHz. The frequency range of the low frequency control signals extends from 6 KHz to 33 KHz. Because a low-frequency bed-identifying frequency is associated with each bed station 5 of a room unit 3*a*, up to six bed stations 5 and a door station 7 may be connected to the room modem 4 by a channel spacing which increases by a factor of 1.2.

Figure 4:
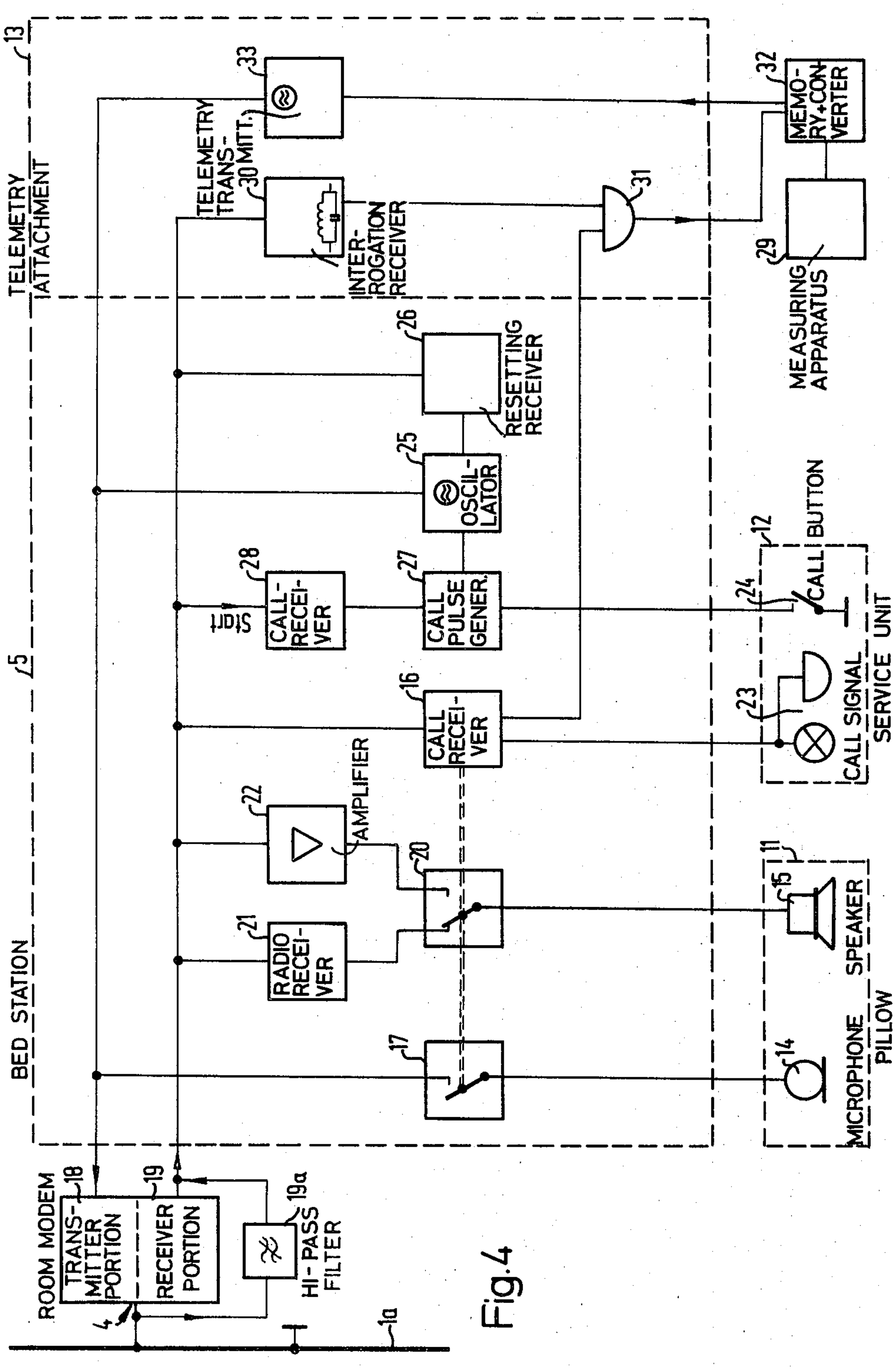
FIG. 4 is a block circuit diagram of a bed intercom station.

A block circuit diagram of the bed station 5 is shown in FIG. 4. The bed station 5 is connected with a room modem 4 which is coupled to the high frequency line 1*a*. Accessory devices 6 of the bed station 5 are a pillow speaker/microphone 11, a service unit 12 and a telemetry attachment 13. The pillow 11 has a microphone 14 and a speaker 15 and permits oral communication between a patient and the nursing personnel. The microphone 14 is connected to the transmitter section 18 of the room modem 4 by means of a switch 17 operated by a call receiver 16. A switch 20, also operated by the receiver 16, alternatively connects the speaker 15 to a radio receiver 21 or, for oral communication, to an amplifier 22. The radio receiver 21 as well as the amplifier 22 are connected to the low frequency output of the receiver section 19 of the room modem 4. A hi-pass filter 19*a* permeable by ultra-short waves and television frequencies in the receiver section 19 connects the high frequency line 1*a* with the low frequency output of the section 19.

The service unit 12 includes a call signal 23, that is, a light and/or a buzzer, and a call button 24. The call receiver 16 is connected to the low frequency output of the receiver section 19 and selectively receives a characteristic bed frequency associated with the corresponding bed station 5. When the characteristic bed frequency is received, the call receiver 16 operates the call signal 23, closes the switch 17, transfers the switch 20 from the radio receiver 21 to the amplifier 22 and establishes oral communication with the patient by means of the pillow 11.

The patient initiates a call by operating the button 24. The indicating device 91 in the central station 2*a* (FIG. 1) indicates the call signal assigned to the respective bed station 5 even after the button 24 is released. An oscillator 25, upon receipt of a starting pulse from the button 24, produces a low frequency signal at the frequency assigned to the bed station 5. The output of oscillator 25 is connected to the transmitter section 18 and continues to oscillate until a resetting receiver 26 connected to the oscillator 25 receives a resetting pulse from the central station 2*a* by way of the receiver section 19 and disconnects the oscillator. The low frequency output of oscillator 25 is modulated with a sequence of call pulses from a call pulse generator 27. The call pulse generator 27 cyclically produces a sequence of call pulses. The number and/or timing of these pulses, with reference to a synchronization signal, corresponds to the rank of the call made. It determines the sequence of the answers given by the central station 2*a*. The greater the number of call pulses issued in a sequence, the faster the calls have to be answered. The indicator device 91 displays the call of highest rank if several calls are generated simultaneously from different bed stations 5.

The call pulses of each bed station 5 occur simultaneously with a synchronizing signal received from the central station 2*a*. This synchronizing signal consists of a periodically repeating synchronizing pulse and a subsequent sequence of 14 call pulses and is transmitted as a modulated high-frequency signal of 470 KHz. A call receiver 28 is connected to the receiver section 19 and also transmits the synchronization signal to the call pulse generator 27 which, according to the set value, generates a number of call pulses synchronous with the synchronization signal.

The telemetry attachment 10 which may be connected to the bed station 5 permits transmission of measured values from a measuring apparatus 29 to the central station 2*a*. The telemetry attachment 13 permits, by means of sensing devices, a continuous surveillance of a patient, for example, in an intensive care station. An output of an interrogation receiver 30 and a further output of the call receiver 16 are connected to an AND gate circuit 31. Upon simultaneous arrival of a low-frequency signal at the characteristic frequency of the bed station 5 at the call receiver 16 and of a measured value interrogation signal at the interrogation receiver 30, the AND gate circuit 31 transmits a starting pulse to the measuring apparatus 29. A converter 32 connected to the measuring apparatus 29 and to a telemetry transmitter 33 modulates the pulse-shaped measured values thereafter generated on a low frequency signal at a measured-value frequency. The measured-value transmitter 33 is also connected to the low frequency input of the transmitter section 18.

The door station 7 illustrated in FIG. 5 generally corresponds to the bed station 5, however, it is adapted to its particular function. Nursing personnel can transmit a call to the central station 2*a* by operating the call button 24 in a door-side signalling device 12' by way of the call pulse generator 27 and the oscillator 25. The call pulse generator 27 is also connected to the call receiver 28 which receives the synchronizing signal from the central station 2*a*. In response to a call from the bed station 5 shown in FIG. 4, the oscillator 25 generates the characteristic frequency of the door station 7 until a resetting pulse from the central station 2*a* disconnects the oscillator 25 by way of the resetting receiver 26. A low-frequency signal generated in the central station 2*a* at the characteristic frequency of the door station 7 switches a call receiver 16' on. The call receiver 16' operates the switch 17 and a further switch 34, and thereby permits oral communication by way of the microphone 14 or the speaker 15 in a telephone 11'. Simultaneously, the call receiver 16' operates the call signal 23 in the door-side signalling device 12'. The nursing personnel, by operating a reporting switch 35, report their presence in the room to the status signal device 10 of the central station 2*a*, a reporting oscillator 36 transmitting a characteristic reporting frequency to the transmitter portion 18 of the room modem 4. The function of the reporting switch 35 can also be assumed by an automatic presence control. The location of the nursing personnel, therefore, is always known and the personnel may be reached by the call signal 23 and over the oral communication line of the telephone 11'. Instead of the telephone 11', a twoway call installation having a speaker and a microphone may be provided.

The central station 2*a* will now be described in more detail with reference to FIGS. 6 and 7. Each central modem 8 has a transmitter section 43 and a receiver section 44. The receiver section 44 is selectively tuned to the characteristic modem frequency of the transmitter section 18 in the room modem 4 of the associated room unit 3*a*. The transmitter section 43 transmits on the second characteristic modem frequency of the room unit 3*a* to which the receiver section 19 of the associated room modem 4 is tuned.

Figure 6:
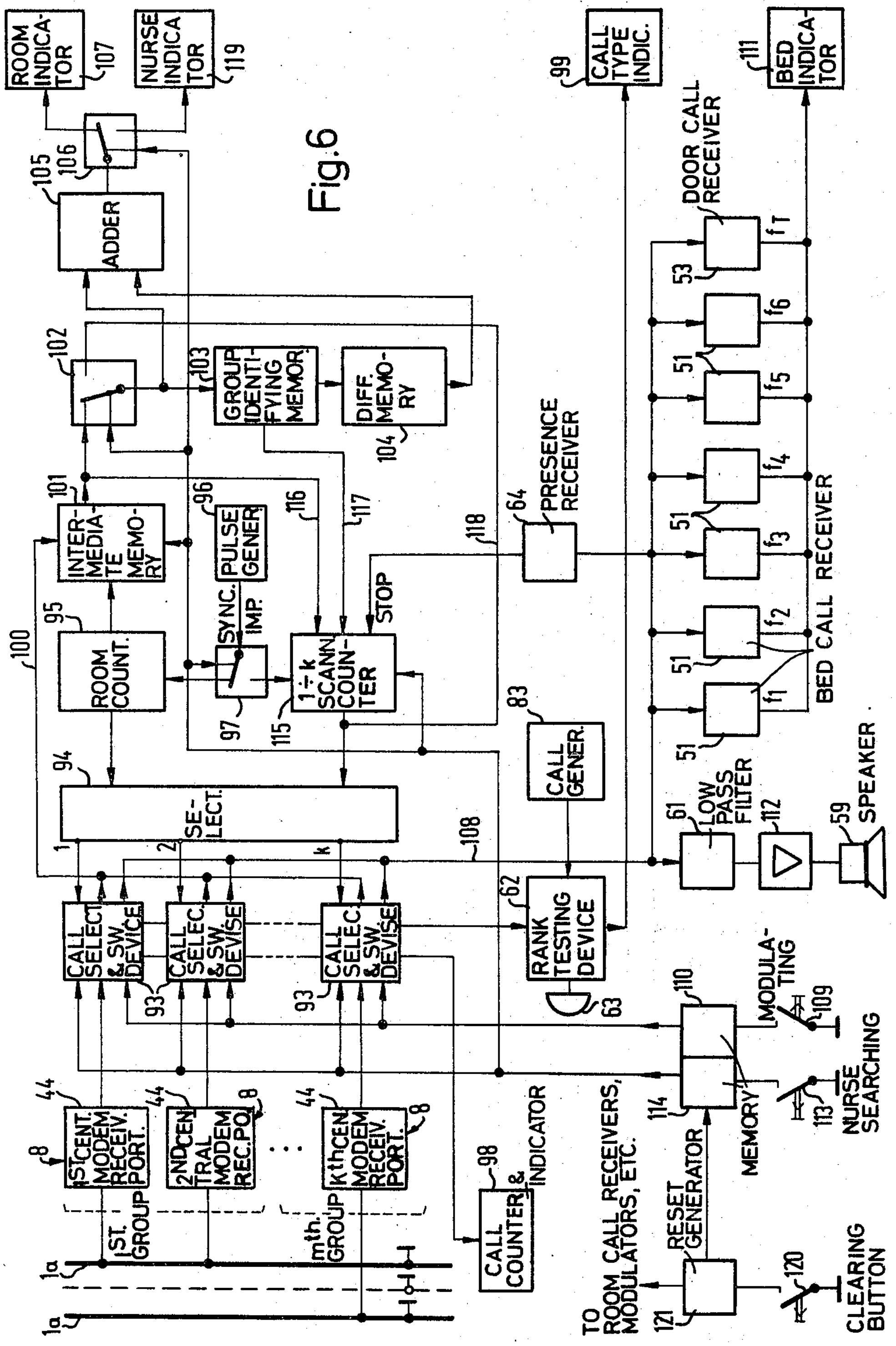
FIG. 6 shows a central receiving unit of the embodiment according to FIG. 1.

FIG. 6 shows a receiver unit of the central station 2*a*. It is arranged to indicate the actual room number which may be different from the sequence assigned by the selecting switch 92. A receiving portion 44 of the central modem 8 is connected to the high frequency line 1*a* of the corresponding group for each room unit 3*a*. The receiver portion 44 transmits the received low-frequency control signals to a corresponding call electing or detecting and switching device 93. Each of the call detecting and switching devices 93 is connected to a selector 94. The selector 94 corresponds to the selecting switch 92 in FIG. 1 and makes sure, by means of a locking circuit, that only one room unit 3*a* can be modulated at the same time. A room counter 95 counts synchronization pulses supplied by a switch 97 from a pulse generator 96 and advances the selector 94 with each synchronizing pulse from one call detecting and switching device 99 to the next.

Since the bed stations 5 yield call pulses synchronously with the synchronization signal, the initiated calls appear synchronously in the corresponding call detection and switching devices 93. A rank testing device 62 is connected with all call detecting and switching devices 93 and determines the call of the highest rank on the basis of the number and/or length of the call pulses which occur after the synchronizing pulse. The call detecting and switching devices 93 compare the found call of highest rank with the calls delivered from the corresponding receiving sections 44. If the rank of the call in one of the call detecting and switching devices 93 coincides with the rank of the call of highest rank, this call detecting and switching device 93 is prepared for switching. Switching occurs as soon as the room counter 95 has switched on the corresponding call detecting and switching apparatus 93 by means of the selector 94 in its counting cycle. If a call of higher rank than others occurs, an acoustic rank signal 63 is sounded by the rank testing device 62 and a type-of-call indicator 99, also connected to the rank testing apparatus 62 shows the rank of the call by indicating the type of call. A call counter 98 is connected to all call detecting and switching devices 93 and indicates the total number of calls received.

If a call detecting and switching device 93 is actuated, it transmits a receiving pulse to an intermediate memory 101 by way of a line 100. The intermediate memory 101 is connected to the room counter 95 and, upon entry of a receiving pulse, releases a sequence number associated with the activated call detecting and switching device 93. The group identifying memory 103 is connected to the intermediate memory 101 by a switch 102. The group identifying memory 103 receives from the intermediate memory 101 the sequence number stored therein and associates the corresponding call detecting and switching device 93 to a certain group. The group identifying memory 103 for this purpose contains a fixed value memory (for example, a field of switches) and a control which identifies the group being passed by the selector 94. A difference memory 104 is connected to the group identifying memory 103 and takes from it the corresponding group. The difference memory or storage device 104 is a fixed value memory which stores a difference number $\Delta z$ specific for each group. The difference number $\Delta z$ is obtained as the difference between the actual room number and the sequence number in the room counter 95. When 100 rooms are present, the room counter 95 counts from 1 to 100. If the rooms are distributed in four groups, for example on four floors, the following table shows the corresponding associations.

| Actual room number | | Group | Difference number $\Delta z$ | Sequential number in the room counter 95 | |
|---|---|---|---|---|---|
| 101 | 125 | 1 | 100 | 1 | 25 |
| 201 | 225 | 2 | 175 | 26 | 50 |
| 301 | 325 | 3 | 250 | 51 | 75 |
| 401 | 425 | 4 | 325 | 76 | 100 |

An adding stage 105 connected by one of its inputs and a switch 102 to the intermediate memory 101, and by another input receiving the difference number $\Delta z$ from the difference memory 104 gives the actual room number to a room indicator 107 by way of a switch 106. The room indicator 106 shows the actual room number as marked on the building. If a nurse operates a switching-in button 109, a memory 110 connected to the switching-in button 109 transmit a switching-in signal to all detecting and switching devices 93. The call detecting and switching device 93 already prepared by the selector 94 thereafter switches-in a low frequency line 108 common to all call detecting and switching devices 93. A bed call receiver 51 is connected to the low frequency line 108 for each bed of a bed station 5 and a door call receiver 53 for the door station 7. The bed call receiver 51 and the door call receiver 53 respond to the low frequency signals with the characteristic bed frequency and the characteristic frequency of the door station 7. A bed indicator 111 also connected in parallel with all bed call receivers 51 and door call receivers 53 indicates the calling bed by means of a number. Simultaneously with operation of button 109, a speaker 59 provides an audible connection through an amplifier 112 and a low pass filter 61 passing speech frequencies and connected to the low frequency line 108.

If a nurse is needed for a patient, the nurse at the nearest location can be sought by means of the central station 2*a*. Upon operation of a button 113 "searching for nurse", an attached memory 114 yields a scanning signal. The scanning signal switches the switches 97, 102, 106 from their position as shown in FIG. 6 to opposite positions. After switching over of the switch 97, the pulse generator 96 transmits synchronization pulses to a scanning counter 115. The scanning counter 115 is connected with the selector 94 and now assumes the function of the deactivated room counter 95. The scanning counter 115 has a forward counter and a backward counter which alternatively are scanned by the synchronization pulses of the generator 96. When the scanning process starts, the forward and backward counters of the scanning counter 115 indicate the same number agreeing with the counter position of the intermediate memory 101 and thus of the room counter 95 which corresponds to that of the room from which the call originated. The selector starts progressing alternatively towards the "left" and the "right" to scan the adjacent rooms. A connection 117 between the group identification memory 103 and the scanning counter 115 prevents the forward and backward counters of the scanning counter 115 from running into an adjacent group. If the selector 94 scans a call detecting and switching device 93 by means of which a nurse indicates her presence, the scanning counter 115 receives a stop signal from a presence receiver 64 also connected to the low frequency line 108. The presence receiver 64 responds selectively at the characteristic presence frequency to a low-frequency signal generated by the reporting oscillator 36 when the reporting switch 35 (FIG. 5) is operated. Because the scanning counter 115 is connected by a line 118 and the switch 102 to the group identifying memory 103, and the switch 106 is also actuated, a nurse indicator 119 indicates the actual number of the room in which the nurse is located. A revolving memory, not shown in the circuit diagram, stores the calls according to their rank and in the sequence of their arrival. The nurse, after answering the calls, operates a clearing button 120 and thus produces a resetting signal by means of a resetting generator 121 which is transmitted to the memories 110 and 114 as well as to the call detecting and switching device 93. Moreover, the resetting signal restores the switches, 97, 102, and 106 to their original condition.

Figure 7:
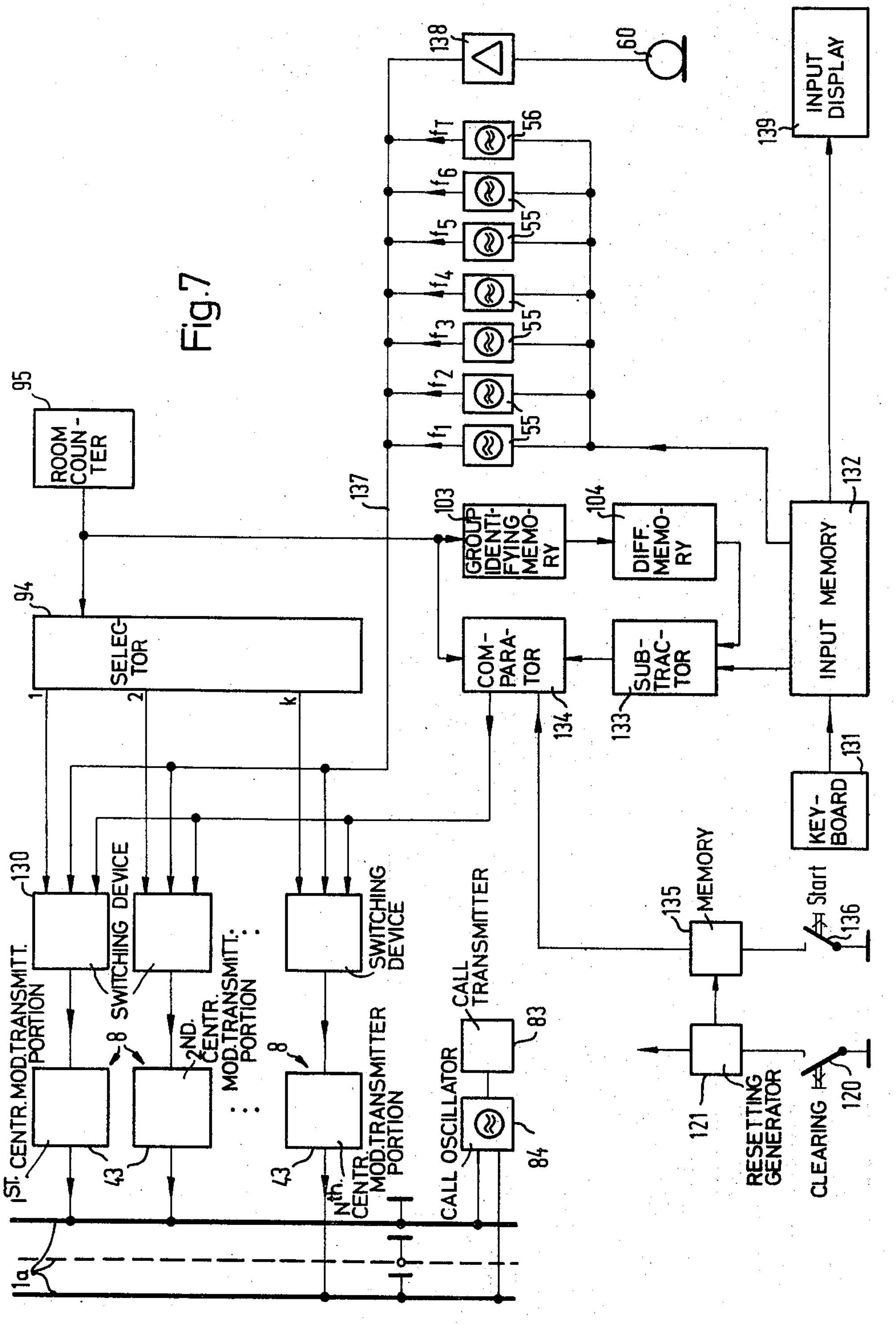
FIG. 7 shows a central transmitting unit of the embodiment according to FIG. 1.

FIG. 7 shows a central transmitting unit of the embodiment according to FIG. 1. The transmitting sections 43 of each central modem 8 are connected to the high frequency line 1*a* in groups. Each transmitting section 43 receives low-frequency control signals of a connected switching device 130. Selector 94 selects the switching device 130 and prepares it for switching. The room counter 95 advances the selector 94 in the sequence of the synchronizing pulses transmitted by the generator 96. The group identifying counter 103 connected to the room counter 95 determines the corresponding group of the switching device 130 prepared for switching and transmits the information to the difference memory 104.

The difference memory 104 thereupon produces the difference number Δz. The nursing personnel sequentially store the actual room number and the bed number in an input memory or storage 132 by means of a keyboard 131. A subtractor 133 connected by respective inputs to the input storage 132 and the difference storage or memory 104 receives the actual room number and the difference number Δz and subtracts them from each other. A comparator connected with the room counter 95 and the subtractor 133 compares the sequence number in the room counter 95 with the difference number in the subtractor 133 when a starting pulse is generated by the personnel by means of a key 136 and a storage or memory 135. If the sequence number in the room counter 95 coincides with the difference number in the subtractor 133, the associated switching device 130 is activated. The last number read into the storage 132 by the key board 131 corresponds to the bed number, and the input storage 132 accordingly switches as associated bed oscillator 55. If the last number read into the input storage 132 is missing, the door oscillator 56 is activated. Because all switching devices 130 and all bed oscillators 55, as well as the door oscillator 56, are connected in parallel to a low frequency line 137, the bed oscillator 55 or the door oscillator 56 selected by the key board 131 are switched in by the switching device 130. The receiving section 19 illustrated in FIG. 4 of the room modem 4 modulates the high frequency carrier oscillations supplied by the high frequency line 1*a*, and the call receiver 16 selectively responding to the characteristic bed frequency of the bed oscillator 55 initiates the call signal 23. A microphone 60 also connected to the low frequency line 137 by an amplifier 138 simultaneously establishes oral communication with the pillow 11 of the bed station or the telephone 11′ of the door station 7 in FIGS. 4 or 5. An input indicator 139 connected to the input storage 132 shows the actual room number and bed number set by the keyboard 131.

When the clearing button 120 is actuated, the resetting generator 121 gives a resetting signal to the storage 135 as well as to the switching devices 130 and clears the previous switching. A call generator 83 produces the synchronization signal and modulates a call oscillator 84. The call oscillator 84 is connected to the high-frequency lines 1*a* of each group and transmits a frequency of 470 KHz.

Figure 8:
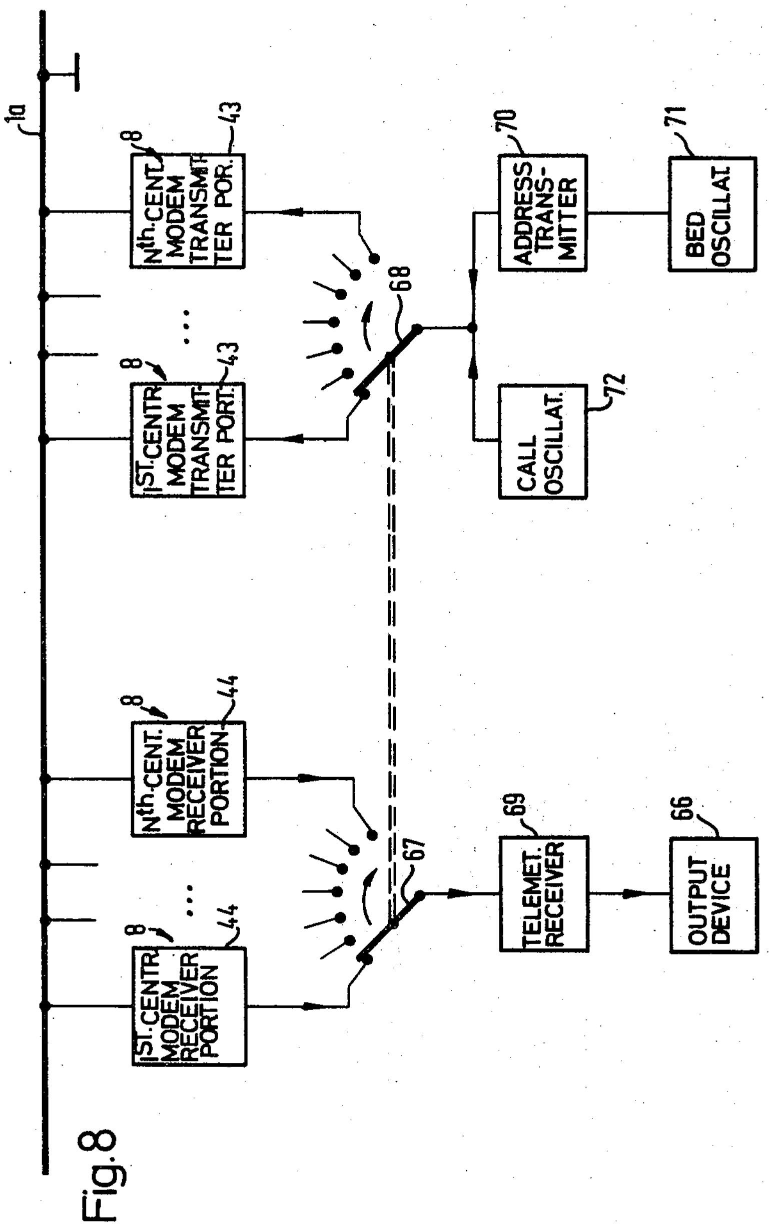
FIG. 8 illustrates a central station for measured values.

FIG. 8 shows an apparatus for centrally collecting measured telemetry values. It permits periodic interrogation of the measured values of measuring instruments 29 connected to the bed station 5 by the telemetry attachment 13. An output device 66 stores the measured values, records them or evaluates them by means of an electronic computer. All measuring attachments 13 of the communication system respond to the same telemetry interrogation frequency, and the measured values of each instrument 29 are transmitted by being modulated on low frequency signals having the same measured-value or telemetry frequency. The room units 3*a* are distinguishable by their timed sequence in a time division multiplex method. An electronically operating multiple pole switch 67 sequentially connects the low frequency output of the receiving section 44 of each central modem 8 to the input of a telemetry receiver 69. The receiver 69 is tuned to the telemetry frequency of the telemetry transmitter 33 in the measurement attachment 13 and connected to the output device 66. A further multiple pole switch 68 connects the transmitter section 43 of the central modem 8, whose receiving section 44 is connected by the multiple pole switch 67 to the telemetry receiver 69, synchronously with the synchronization signal with an address transmitter 70. The address transmitter 70 produces a low freguency signal at the characteristic bed frequency of a bed station 5 which may be selected by the nursing personnel and is connected for this purpose with bed oscillators 71. The measuring instrument 29 associated with a certain bed station 5 yields its measured values when the characteristic bed frequency of this bed station 5 and the telemetry interrogation frequency are simultaneously present. The further multiple pole switch 66 for this purpose sequentially connects the transmitter section 43 of each central modem 8 with an interrogation oscillator 72 which produces a low frequency signal at the telemetry interrogation frequency common to all telementry attachments 13. The coordination of the measured values indicated in the output device 66 with the bed station 5 of each room units 3*a* results from the setting of the address transmitter 70. The multiple pole switch 67 and the further multiple pole switch 68 advance the central telemetry station with a switching frequency of approximately 100 Hz from one room unit 3*a* to the next. The address transmitter 70 can be arranged in such a manner that it interrogates the several bed stations 5 of a room unit 3*a* for their measured values between the switching steps.

The afore-described oral communication between the room unit 3*a* and the central station 2*a* is based on the assumption that nursing personnel are present in the central station 2*a*. This is not always the case during the night hours. The communication system, therefore, may be supplemented by an apparatus illustrated in FIG. 9 for secondary calls 73. The apparatus for secondary calls 73 has a first scanning modem 74 equipped with a first scanning receiver 75 and a first scanning transmitter 76, and a second scanning modem 77 having a second scanning receiver 78 and a second scanning transmitter 79. The first scanning modem 74 and second scanning modem 77 are connected at their high frequency sides to the high frequency line 1*a*. At the low frequency side, the first scanning receiver 75 is connected with the second scanning transmitter 79, and the first scanning transmitter 76 is connected with the second scanning receiver 78 by respective low frequency lines 80. The first scanning receiver 75 and the first scanning transmitter 76 of the first scanning modem 74 set their instantaneous receiving and transmitting frequencies in a time division multiplex method sequentially to the characteristic modem frequencies of the individual room units 3*a*. The instantaneous transmitting frequency and the instantaneous receiving frequency change according to the characteristic modem frequencies in fixed frequency steps of 250 KHz and are spaced apart by 10.7 MHz. The second scanning modem 77 corresponds in its structure to the first scanning modem 74.

The apparatus 73 for secondary calls may be operated independently of the central station 2*a*. Its mode of operation is illustrated by the following example. A first room modem 81 has the characteristic modem frequencies of 20 MHz when transmitting and 30.7 MHz when receiving. A second room modem 82 has the characteristic modem frequencies of 25 MHz when transmitting and 35.7 MHz when receiving. A patient initiates a call on the transmitting frequency of 20 MHz by means of his bed station 51 connected to the first room modem 81. A first scanning receiver 75 of the first scanning modem 74 detects the call emanating from the first room modem 81 by sequentially testing the characteristic modem frequencies of all room units 3*a*. Because the instantaneous transmitting frequency of the first scanning transmitter 76 has the same spacing from the instantaneous receiving frequency of the first scanning receiver 75 as is found between the two characteristic modem frequencies of the first room modem 81, both the first scanning receiver 75 as well as the first scanning transmitter 76 ace tuned to the first room modem 81. The nurse present indicates her presence by operating the reporting switch 35 in the door station 7 by means of the second room modem 82. The second room modem 82 emits a control signal at the characteristic modem frequency of 25 MHz. The second scanning modem 77 also checks in timed sequency the characteristic modem frequencies of each room unit and detects the control signal coming from the second room modem 82. According to the first scanning modem 75, the second scanning receiver 78 and the second scanning transmitter 79 are thus also tuned to the respective characteristic modem frequencies of second room modem 82.

The first scanning modem 74 terminates its scanning process by testing the characteristic modem frequencies of 20 and 30.7 MHz respectively. The scanning process of the second scanning modem 77 is terminated upon checking the characteristic modem frequencies of 25 and 35.7 MHz. The instantaneous transmitting frequencies and receiving frequencies of the first scanning modem 74 and of the second scanning modem 77 remain set at the characteristic modem frequencies of the first and second room modems 81, 82, respectively. Because the first scanning modem 74 is connected on its low frequency side to the second scanning modem 77 by the low frequency lines 80, oral communication between the first room modem 81 and the second room modem 82, and thus between the patient and the nurse present is established.

Figure 10:
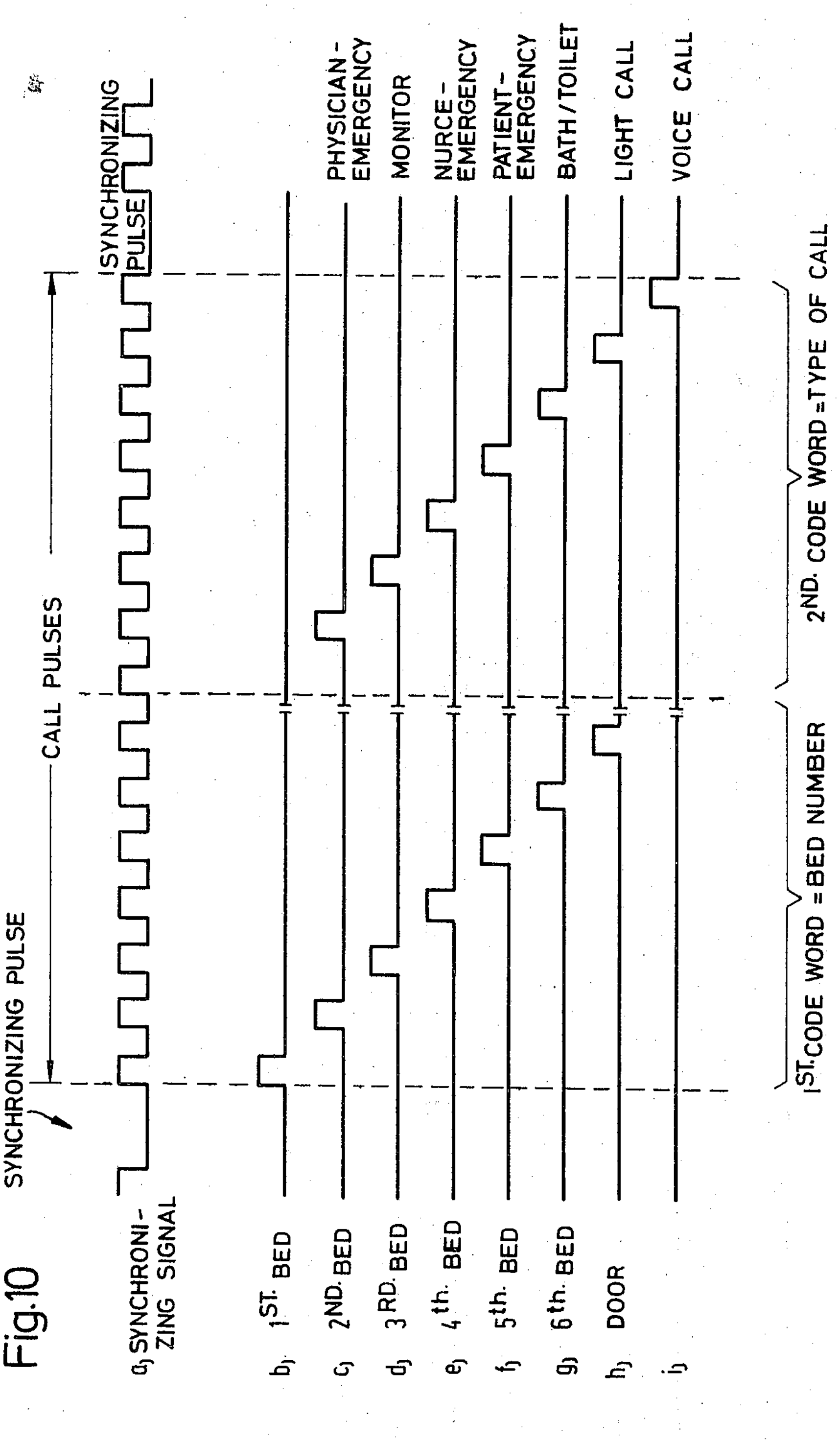
FIG. 10 is a diagram of pulses for characterizing beds in one room.

FIG. 10 is a pulse diagram of a further embodiment which employs a pulse code for characterizing beds in one room in a manner different from that described above.

FIG. 10*a* shows the synchronizing signal which comprises a periodically recurring gap as a synchronizing pulse and a subsequent sequence of 15 call pulses. The synchronizing signal generated by the call generator 83 and transmitted from the call oscillator 84 to the high frequency line 1*a* is available in each bed station 5 and in each door station 7. By selecting a single pulse from the first seven call pulses, there is obtained a single code word associated with the bed numbers 1 – 6 and the door station 7. As shown in FIGS. 10*b* – 10*h*, the interval between respective pulses and the synchronization gap determines the bed number. A second code word follows the first code word. The second code word determines the type of call by selecting a single pulse from the remaining call pulses, and thus establishes the rank of the call. The higher the rank of the call, the earlier its corresponding pulse appears in the second code word. In this manner, the call of higher rank can be given precedence during simultaneous arrival of several calls of different rank, because the higher ranking call is recognized sooner than calls of lower rank. The second code words of FIG. 10*i* and 10*h* distinguish between an oral call and a light call which does not permit oral communication. The second code word according to FIG. 10*g* is associated with a call from a bathroom. Of even higher rank are the emergency calls represented in FIGS. 10*f* and 10*e* which may originate from a patient or a nurse. The second code word according to FIG. 10*d* is associated with a telemetry monitor. The call type of highest rank is the physician emergency call illustrated in FIG. 10*c*. The first and second code words may be combined in any desired manner.

Figure 11:
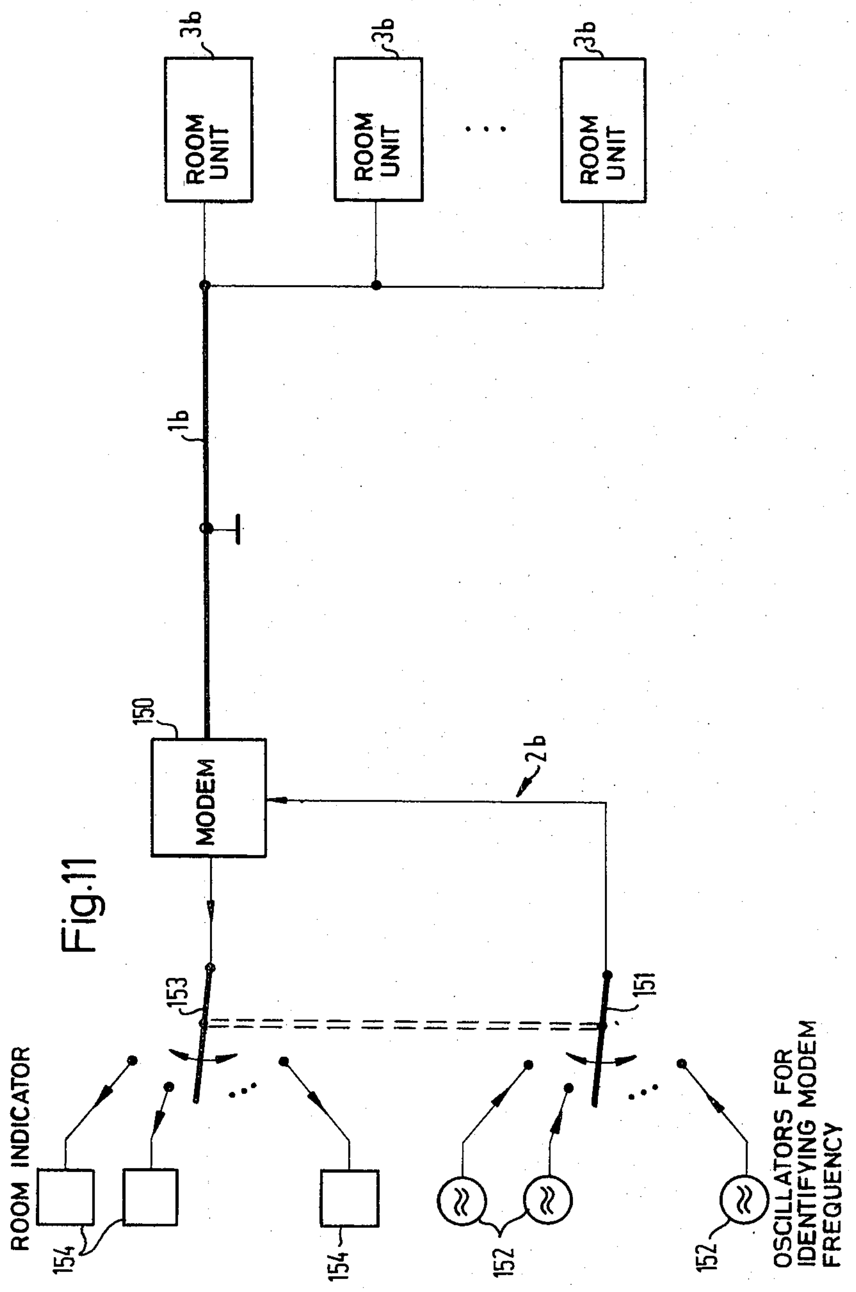
FIG. 11 is a basic block circuit diagram of another embodiment.

FIG. 11 is a basic block diagram of a further embodiment of the communication system of the invention. Parts which are identical in function with those described before are provided with the same reference numeral and the distinguishing letter *b*.

Room units 3*b* are connected in parallel to a high frequency line 1*b*. A single modem 150 for all room units 3*b* is connected in a central station 2*b* to the high frequency line 1*b*. A selector switch 151 connects the modem 150 to oscillators 152 for generating characteristic modem frequencies in timed sequence. The oscillators 152 produce the modulating frequencies associated with the respective room units 3*b* and tune the modem 150 to the characteristic modem frequencies. If a call issues from a room unit 3*b*, the selector switch 151 stops at the oscillator of this room unit 3*b*. A further selector switch 153 is coupled with the selector switch 151 and connects a room indicator 154 associated with the calling room with the modem 150. The room indicator 154 indicates the call. A bed indicator, now shown in FIG. 11, shows additionally which bed is calling. The oral communication or a call from the central station 2*b* can be transmitted by way of the modem 150 or over a further non-illustrated modem connected to the high frequency line and to further oscillators 152 for modulating frequencies.

Figure 12:
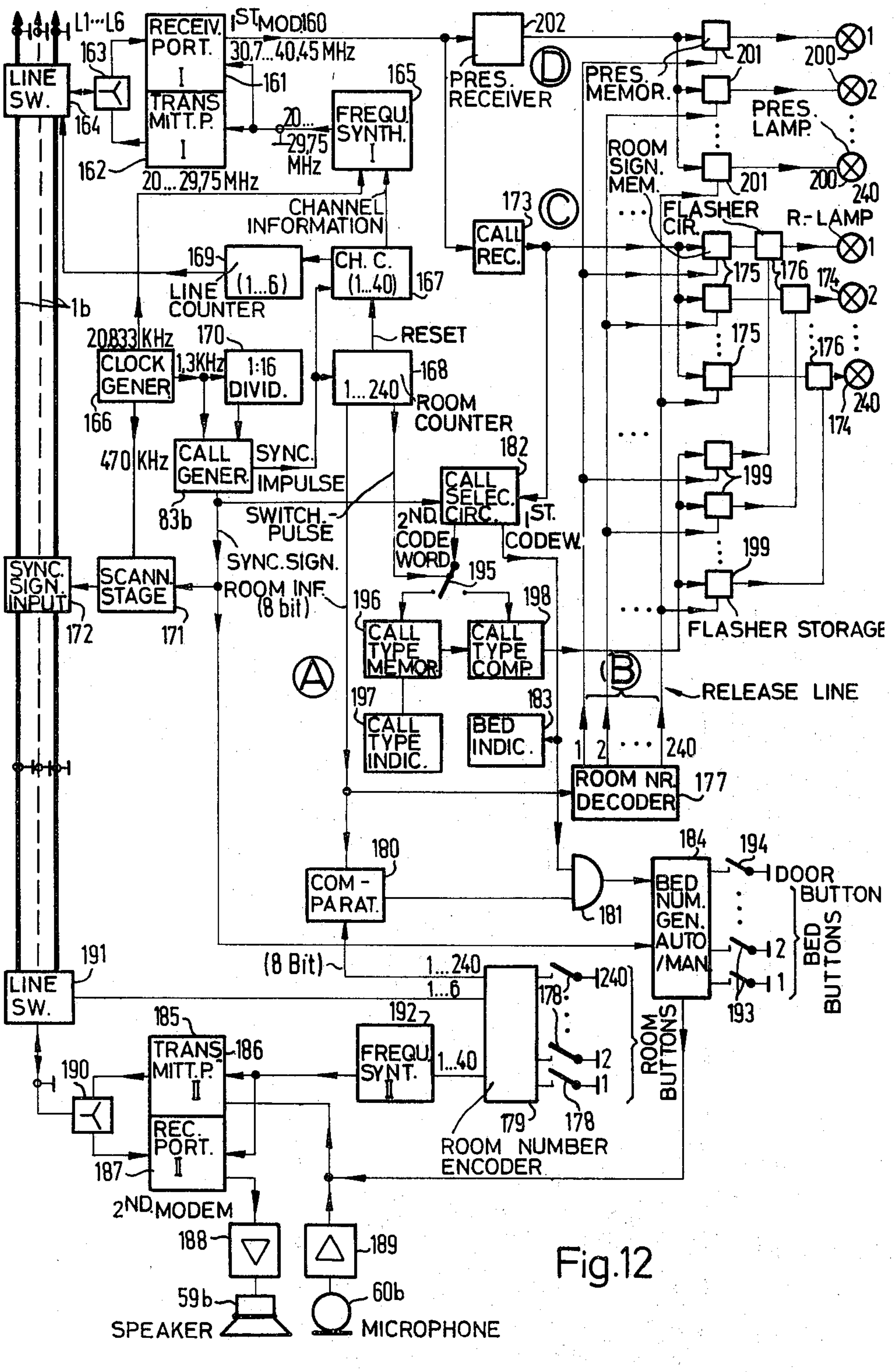
FIG. 12 is a block circuit diagram of a central station according to FIG. 11.

FIG. 12 shows a block diagram of the central station 2*b* in FIG. 11. In this embodiment, a pulse code according to FIG. 10 determines the bed number and the type of call. In this specific embodiment, 240 rooms in groups of 40 rooms each are connected to six line $L_1$ to $L_6$. The characteristic modem frequencies of each room unit 3*b* are repeated in each group.

A first modem 160 capable of being tuned to the characteristic modem frequencies of a group has a receiver section 161 and a transmitter section 162. A high frequency switch or filter 163 connects the receiver section 161 and the transmitter section 162 on the high frequency side. The switches or filters are connected to a line selector switch 164 which selects one of the six lines 1*b* according to the group of the room unit 3*b* and connects it with the high frequency filter or switch 163. A first frequency synthesizer 165 is connected to the receiver section 161 and to the transmitter section 162 of the first modem 160 and determines the characteristic modem frequencies to which the first modem 160 is tuned. The first frequency synthesizer 165 takes a basic or reference frequency (in this instance 20,833 KHz) from a quartz-controlled generator 166 and produces an oscillator frequency for the receiver section 161 and the transmitter section 162 corresponding to supplied channel information.

The channel information is a number between 1 and 40 in binary code and is associated with a room unit 3*b* in a group. A channel counter 167 produces the channel information by counting the synchronization pulses in the synchronization signal produced by a call signal generator 83*b*. At each synchronization pulse from the call signal generator 83*b*, the channel counter 167 advances the first frequency synthesizer 165 from the characteristic modem frequency of one room unit 3*b* to the characteristic modem frequency of the next unit. The sequence in which the room units 3*b* of all groups are to be switched-in is determined by a room counter 168. The room counter 168 is a binary counter counting from 1 to 240 which is also connected with the call generator 83*b* and advances by one unit at each synchronization pulse. After each fortieth synchronization pulse, the room counter 168 transmits a resetting pulse to the channel counter 167, and the channel counter 167 again starts counting from zero. After forty counted synchronization pulses, the channel counter 167 emits an advancing pulse to a line counter 169. The line counter 169 is connected to the line switch 164 and advances the switch from one high frequency line 1*b* to the next.

The call generator 83*b* generates the synchronization signal. For this purpose, frequency generator 166 transmits to the call generator 83*b* a signal at a frequency of 1.3 KHz as a clock pulse for the call pulses. A 1:16 divider 170 is also connected with the call generator 83*b* and divides the frequency of this signal by 16. The call generator 83*b* thereupon selects each 16th call pulse as a synchronization pulse, for example by blocking it out as a synchronization gap. A scanning stage 171 receives the synchronization signal consisting of synchronization pulses and call pulses from the call generator 83*b* and modulates it on a 470 KHz-signal received from the generator 166. A synchronizing signal input 172 is connected with the scanning stage 171 and feeds the modulated synchronization signal simultaneously to all high frequency lines 1*b*.

A call receiver 173 is connected with a low frequency output of the receiver section 151 and detects a call signal transmitted from a room unit 3*b*. The call signal is a low frequency signal with a call frequency common to all bed stations which is modulated with the first and second code word for identifying the bed number and the type of call. The call receiver 173 prepares a room signal 174 associated with a room unit 3*b* by means of respective room signal memories 175 and a flasher circuit 176 for indicating the call signal. The call receiver 173 for this purpose is connected in parallel to all room signal memories 175. A room number decoder 177, in accord with the room information A from the room counter 168, then switches-in the room signal 174 corresponding to the calling room unit 3*b*. The room number decoder 177 has 240 outputs B respectively connected with the room signal memories 175 by a releasing line and switches-in one of the outputs B corresponding to the 8 bits of the room information A in a code of from 1 to 240.

If one of the room signals 174 indicates a call signal, the nursing personnel must switch in by operating a corresponding room key 178. The room keys 178 are connected to a room number encorder 179 which converts one of the 240 code signals into an 8-bit recall signal. A comparator 180 connected to the room number encoder 179 and the room counter 168 compares this recall signal with the room information A. Comparator 180 is connected at its output end with the input of an AND gate 181 and enables the latter for switching through when the call signal and the room information A are equal. A further input of the AND gate 181 is connected to a first output of a call detecting circuit 182. The call detecting circuit 182 is connected with the call receiver 178 and with the call generator 83b and receives the call signal from the call receiver 173 synchronously with the synchronization signal. The first output of the call detector circuit 182 yields the first code word corresponding to the bed number. A bed indicator 183 connected to the first output shows the bed number of the calling bed. The AND gate 181 prepared by the comparator 180 transmits the first code word to a bed number generator 184. The bed number generator 184 in this case then automatically transmits a further call signal to a second modem 185. This further call signal switches in a call receiver in the calling bed station (not illustrated), and thereby establishes oral communication. The second modem 185 for this purpose has a transmitter section 186 and a receiver section 187. The receiver section 187 is connected by an amplifier 188 to a speaker 59*b*. A microphone 60*b* is connected by an amplifier 189 to the transmitter section 186. A further high frequency switch or filter 190 connects the transmitter section 186 and the receiver section 187 on the high frequency side and connects the second modem 185 to a further line switch 191. The line switch 191, in accordance with the signal from the room number encoder 179, selects one of the six high frequency lines 1*b*. A second frequency synthesizer 192 takes channel information from the room number encoder 179 and tunes the transmitter section 186 and the receiver section 187 to the characteristic frequencies of the modem by generating corresponding oscillator frequencies. Bed keys 193 and a door key 194 are connected to the bed number transmitter 184. By operating the bed keys 193 or the door key 194, the function of the bed number generator 184 may also be initiated manually.

The room signal 174 of highest rank may be periodically switched on and off for short intervals by means of the flasher circuit 176. The call detecting circuit 182 for this purpose releases from its second output the second code word corresponding to the type of call to a switch 95. A switching pulse released after each 240 counting steps by the room counter 168 switches the switch 195 once. In one position, the switch 195 directs the second code word to a call-type memory 196 where the types of calls occurring in a first counting cycle of the room counter 168 are stored and indicated by a call-type indicator 197. When the next counting cycle starts, the switching pulse switches the switch 195 to a second position and thereby directs the second code word to a call type comparator 198. The comparator 198 compares the type of call of highest rank present in the memory 196 with the types of call occurring in the second counting cycle. When a call of higher rank occurs in the second cycle, the call type comparator 198 enables the flasher circuits 176 of associated flasher memories 199 for writing. Each flasher memory 199 being connecting by a corresponding release line with one of the outputs B of the room number decoder 177, the flasher memory 199 associated with the call of highest rank switches in the corresponding flasher circuit 176. The corresponding room signal 174 indicates this fact by flashing.

For each of the 240 room units 3b there is provided a presence indicator 200 which indicates the presence signal according to FIG. 10h. Each presence indicator 200 is connected to a presence receiver 202 by a presence storage 201 in parallel. The presence receiver 202 takes the presence signal from the receiver section 161 and enables all presence memories 201 for writing. Each of the presence memories 201 is connected with one of the outputs B of the room number decoder 177 by a release line, the decoder switching in the called presence indicator 200 corresponding to the room information from the room counter 168.

Figure 9:
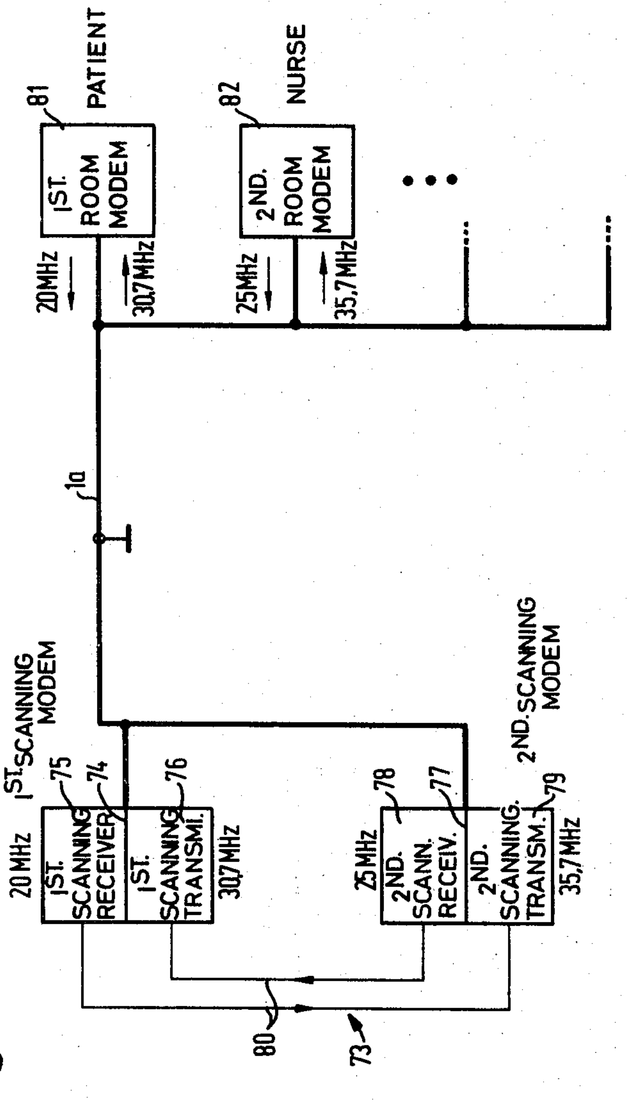
FIG. 9 shows an arrangement for re-routing patients' calls.
Figure 13:
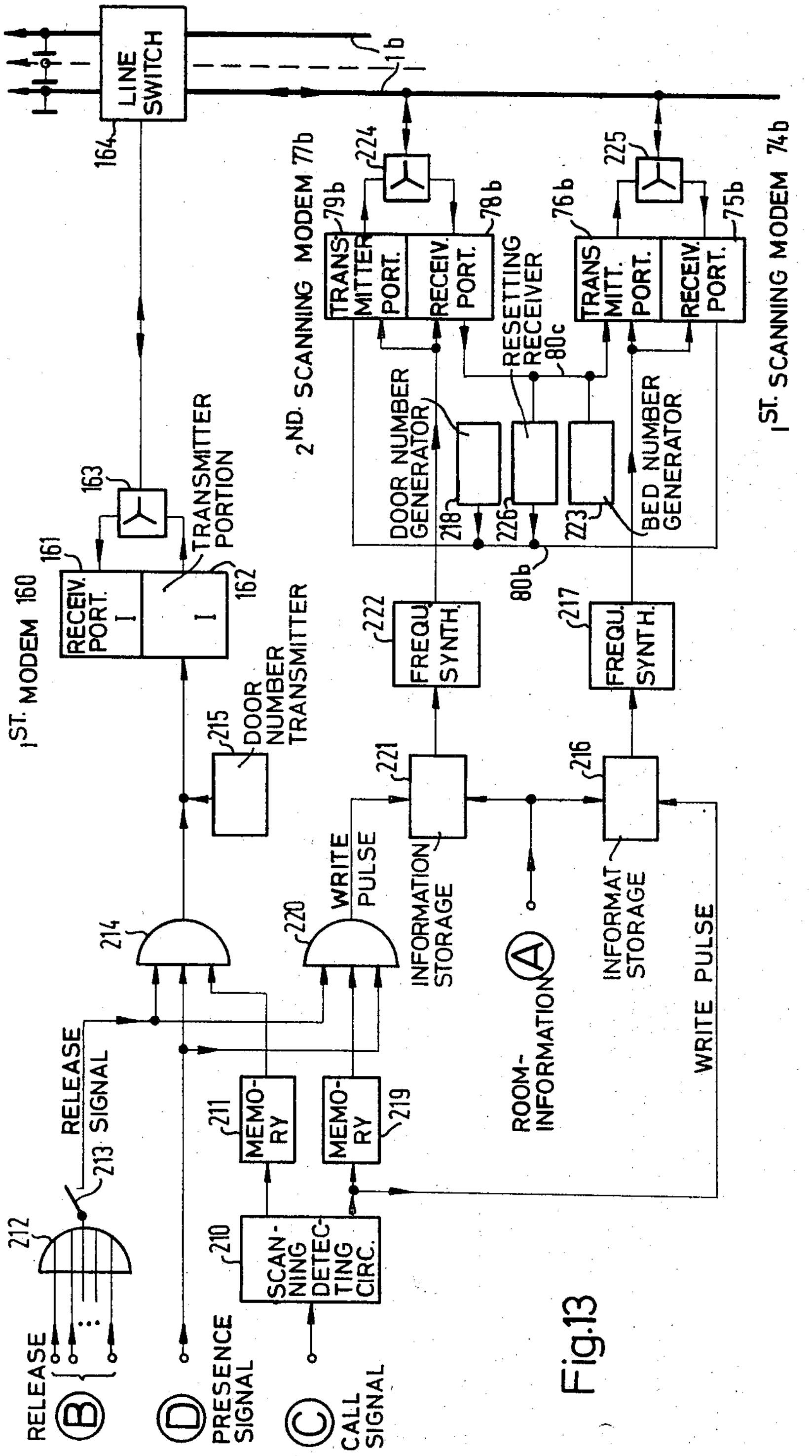
FIG. 13 shows an apparatus for re-routing patients' calls from the central station according to FIG. 12.

FIG. 13 illustrates apparatus for re-routing calls through a central station according to FIG. 12, the apparatus being analogous to that of FIG. 9. This apparatus connects nursing personnel in one room with a patient in another room if the central station is not manned. The apparatus shown in FIG. 13 examines whether the call of the patient is suitable for oral communication. A call is not so suitable when the patient, for example, does not have a pillow equipped with a microphone and a speaker. In this case, the nurse must be called by means of a normal light signal.

Whether a call may be answered orally or not is decided by a detecting circuit 210 which receives the call signal from the call receiver 173 at C in FIG. 12.

The memory 211 is connected to one output of the detecting circuit 210 and stores a call signal not capable of oral communication. Simultaneously, with the presence signal D occurring at the output of the presence receiver 202 in FIG. 12, the room counter 168 indicates the sequential number of a room having a nurse present. Release lines combined into a nursing group and starting at outputs B of the room number decoder 177 in FIG. 12 are connected to inputs of an OR gate 212. A release signal appears at one output of the OR gate 212 when the room counter 168 in FIG. 12 is set for the room unit 3b in which a nurse is present. A switch 213 interrupts the release signal and switches the device for re-routing calls in and out. An AND gate 214 receives on its respective inputs the call signal from the memory 211, the presence signal D, and the release signal. If all three signals are simultaneously present, the first modem 160 (FIG. 12) is connected to the room unit 3b from which the presence signal D originates. An output of the AND gate 214 is connected to the transmitter section 162 of the first modem 160 and generates a call signal to the room unit 3b in which the nurse is present by way of the high frequency filter 163 and over the line switch 164. A door number transmitter 215 is also connected to the transmitter section 162. It generates a call signal having a first code word according to FIG. 10h and a second code word according to FIG. 10h. The door station of the room unit 3b in which the nurse is present indicates this call signal. The origin of the call is determined by the nurse by a conventional light signal in front of the patient's room.

When a call signal is suited for oral communication, the detecting circuit 210 issues a writing pulse to an information storage device 216 from one of its other outputs, whereby the room information A from the room counter 168 (FIG. 12) is written into memory, corresponding to the room number of the calling patient. The information storage device 216 is connected with a frequency synthesizer 217 which tunes a first call re-routing modem 74b to the characteristic modem frequency of the calling room unit 3b. Simultaneously, a memory 219 stores the written pulse and indicates even after the room counter 168 (FIG. 12) proceeds further that a call capable of oral communication is present. The memory 219 enables an AND gate 220 for release of a writing pulse to a further information storage device 221. The AND gate 220 releases the writing pulse if the presence signal D from another room unit 3b in which a nurse is present and the release signal are present simultaneously.

In response to the writing pulse, the room information A is written from the room counter 168 into the information storage device 221. The room information A in the information storage device 221 controls a further frequency synthesizer 222 and tunes a second call re-routing modem 77b to the characteristic modem frequency of the room unit 3b in which a nurse is present.

In a manner similar to that described with reference to FIG. 9, the first modem 74b is provided with a receiver section 75b connected to the transmitter section 79b of the second modem 77b by low frequency line 80b. The receiver 75b is tuned to the characteristic modem frequency at the transmitter section of the room unit 3b of the patient, and the transmitter 79b transmits signals on the characteristic modem frequency of the receiver in the room unit 3b in which the nurse is present. A door number transmitter 218 is also connected to the low frequency line 80b and selects the door station of the room unit 3b in which the nurse is present by emitting a call signal with a first code word according to FIG. 10h and a second code word according to FIG. 10i. A transmitter 76b of the first call re-routing modem 74b is connected with a receiver 78b of the second call re-routing modem 77b by a low frequency line 80c. The receiver 78b is tuned to the characteristic modem frequency of the transmitter in the unit 3b in which the nurse is present, and the transmitter 76b emits signals on the characteristic modem frequency of the room unit 3b of the patient. A bed number transmitter 223 is connected to the low frequency line 80c and selects the bed station of the patient by means of the transmitter 76b. The first and second call re-routing modems 74b and 77b are connected to the high frequency line 1b of a nursing group by respective high frequency filters 224 and 225. After completion of the call, the nurse disconnects the voice connection from the door station of her room unit 3b by means of a resetting receiver 226 connected to the low frequency lines 80b and 80c. The resetting receiver 226 prepares the apparatus for call re-routing during a new call.

The bed stations connected to the room unit 3b correspond essentially to the bed stations 5 illustrated in FIG. 4 with the exception that the resetting receiver 26 is omitted and the call receiver 16 takes care of resetting. The call receiver 16 is connected for this purpose with the call receiver 28 and takes the synchronizing signal from it. The door station of room unit 3b corresponds essentially to the door station 7 from FIG. 5. Here too, the call receiver 16' assumes the function of the resetting receiver 26. Additionally, a resetting generator is connected to the receiver section 19 so that the nurse, upon separating the call following device, can operate the resetting receiver 226 in FIG. 13.

What is claimed is:

1. Communication system for hospitals and the like, said system transmitting communications signals between sub-units of room units and a central station over a common high-frequency line, each of said room units having a characteristic frequency assigned thereto which serves both as a room unit address signal and a carrier for the address signals of the sub-units, said system including:

a receiving device coupled to said high-frequency line for receiving communications signals from said room units; and means said receiving device to the respective characteristic frequencies assigned to said room units in timed sequence.

2. The system according to claim 1 further comprising:

means for transmitting a synchronization signal over said high-frequency line from said central station to said room units; and means, associated with each of said room units, for receiving said synchronization signal and for generating sub-unit address signals and control signals in synchronism with said synchronization signal.

3. The system according to claim 2 wherein said room units are functionally combined into groups, and said system further comprises:

a plurality of discrete high-frequency lines, one for each of said groups of room units, each of the room units in a given group having a different characteristic frequency assigned thereto from a sequence of characteristic frequencies, said sequence being repeated for each of said groups of room units.

4. The system according to claim 3 wherein the system further includes, for each room unit:

a high-frequency transmitter tuned to a first, predetermined transmitting frequency; and a high-frequency receiver tuned to a second, predetermined receiving frequency, the difference between said first and second frequencies being identical for each room unit in a given group of room units.

5. The system according to claim 4 wherein each of the sub-units within a given room unit is assigned a unique address signal selected from a sequence of address signals, said sequence being repeated for each of said room units.

6. The system according to claim 5 further including, for each of said sub-units:

means for generating a low-frequency address signal and a low-frequency control signal, each having a unique frequency.

7. The system according to claim 6 wherein said address and control signal generating means generates said address signal and said control signal as a coded sequence of pulses, said synchronization signal receiving means synchronizing said sequence of pulses with said synchronization signal.

8. The system according to claim 7 further including means for generating a rank-indicating signal modulated upon the low-frequency output of said address and control signal generating means, said rank-indicating signal being generated subsequent to each address or control signal.

9. The system according to claim 8 wherein said rank-indicating signal generating means generates said rank-indicating signals as a coded sequence of pulses, and said address and control signal generating means generates said signals on a low-frequency signal common to a plurality of sub-units.

10. The system according to claim 7 further comprising, at said central station:

a decoding receiver for each group of sub-units, said decoding receiver recovering the sub-unit addresses and control functions from the coded sequences of pulses transmitted from said sub-units to said central station.

11. The system according to claim 2 wherein said receiving device comprises:

a plurality of individual high-frequency receivers coupled to said high-frequency line, one receiver being provided for each room unit, said receiver being tuned to the characteristic frequency of the corresponding room unit, the system further comprising:

switching means, coupled to the outputs of said individual receivers, for selectively connecting the output of said receivers to a detecting device.

12. The system according to claim 11 further including means, connected to said switching means, for synchronizing said switching means with the synchronization signal.

13. The system according to claim 2 further comprising:

a clock generator; and a frequency synthesizer, connected to and driven by said clock generator, the output of said synthesizer providing the intermediate frequencies necessary for tuning said receiving device to the several characteristic frequencies of said room units.

14. The system according to claim 13 further comprising means for synchronizing the sequential tuning of said receiving device with said synchronization signal.

15. The system according to claim 2 wherein said central station further comprises a plurality of low-frequency receivers for detecting low-frequency sub-unit address and control signals transmitted to said central station from said sub-units.

16. The system according to claim 2 wherein said central station further includes:

a low-frequency receiver; and means for sequentially tuning said low-frequency receiver to the low-frequency sub-unit addresses and low-frequency control signals from said sub-units.

17. The system according to claim 2 further including, at said central station, signallling means for indicating to an attendant that an address signal has been received from a room unit or a sub-unit, or that a control signal has been received therefrom.

18. The system according to claim 2 further comprising:

means for storing room unit and sub-unit address signals and control signals received at said central location; and indicating means for sequentially interrogating said storing means and displaying to an attendant all address and control signals so received.

19. The system according to claim 18 further comprising:

a computer for converting the room unit and sub-unit addresses stored in said storing means from a base corresponding to their position in the sequence of characteristic signals to a base corresponding to the actual physical location of said room units and sub-units in the hospital.

20. The system according to claim 8 further including a rank-testing device, which comprises:

means for separating the rank indicating signal from each incoming address signal;

means for ordering the incoming address signals according to their rank; and means for determining the sequence in which said address signals are to be displayed to an attendant.

21. The system according to claim 1 further including means for switching calls from a first room unit to a second room unit, through said central station, which comprises:

first and second scanning transceivers connected to said high-frequency line, the transmitter of said first transceiver being connected by a low-frequency line to the output of the receiver associated with said second transceiver, and the transmitter of said second transceiver being connected by a low-frequency line to the output of the receiver associated with the first scanning transceiver; and means for tuning the transmitting and receiving frequencies of said first and second scanning transceivers to the respective characteristic frequencies of said first and second room units.

22. The system according to claim 21 further including first and second frequency synthesizers respectively connected to the receivers and transmitters of said first and second scanning transceivers, each frequency synthesizer generating an intermediate frequency determinative of said receiving and transmitting frequencies.

23. The system according to claim 22 further including means, responsive to the room unit address signals received at said central station, for determining the intermediate frequencies generated by said first and second frequency synthesizers.

24. The system according to claim 1 further including a telemetry control device at said central station responsive to an accessory control signal transmitted with a room unit address signal for interrogating an accessory device associated with said room unit.

25. The system according to claim 1 further including means for switching an incoming telephone call at said central station to a patient in a room unit or sub-unit via said high-frequency line.

26. The system according to claim 4 further comprising, for each room unit:

a clock generator; and a frequency synthesizer connected to and driven by said clock generator, said synthesizer generating the characteristic transmitting frequency for said room unit and the intermediate frequency determinative of the receiving frequency of said room unit.

* * * * *

UNITED STATES PATENT OFFICE
CERTIFICATE OF CORRECTION

Patent No. 3,872,440 Dated March 18, 1975

Inventor(s) LEO BENZ ET AL

It is certified that error appears in the above-identified patent and that said Letters Patent are hereby corrected as shown below:

In the heading, after line [30], change "2223797" to -- 22 33 797.9 --.

In claim 1, line 12, after "means" insert -- tuning --.

Signed and sealed this 6th day of May 1975.

(SEAL)
Attest:

RUTH C. MASON
Attesting Officer

C. MARSHALL DANN
Commissioner of Patents and Trademarks